US012484559B2

(12) United States Patent
Ichiki et al.

(10) Patent No.: US 12,484,559 B2
(45) Date of Patent: Dec. 2, 2025

(54) BAG WORM NEST MATERIAL

(71) Applicants: NATIONAL AGRICULTURE AND FOOD RESEARCH ORGANIZATION, Tsukuba (JP); KOWA COMPANY, LTD., Nagoya (JP)

(72) Inventors: Ryoko Ichiki, Tsukuba (JP); Taiyo Yoshioka, Tsukuba (JP); Tsunenori Kameda, Tsukuba (JP); Takayuki Matsuda, Tsukuba (JP); Akimune Asanuma, Tsukuba (JP)

(73) Assignees: NATIONAL AGRICULTURE AND FOOD RESEARCH ORGANIZATION, Tsukuba (JP); KOWA COMPANY, LTD., Nagoya (JP)

( * ) Notice: Subject to any disclaimer, the term of this patent is extended or adjusted under 35 U.S.C. 154(b) by 0 days.

(21) Appl. No.: 18/569,972

(22) PCT Filed: Jun. 20, 2022

(86) PCT No.: PCT/JP2022/024452
§ 371 (c)(1),
(2) Date: Jan. 4, 2024

(87) PCT Pub. No.: WO2022/265120
PCT Pub. Date: Dec. 22, 2022

(65) Prior Publication Data
US 2024/0276960 A1    Aug. 22, 2024

(30) Foreign Application Priority Data

Jun. 18, 2021 (JP) .................................. 2021-101905

(51) Int. Cl.
*A01K 67/30* (2025.01)
*A01K 1/00* (2006.01)

(52) U.S. Cl.
CPC ................ *A01K 67/30* (2025.01); *A01K 1/00* (2013.01)

(58) Field of Classification Search
CPC ........ A01K 67/30; A01K 67/35; A01K 67/34; A01K 67/362; A01K 67/033; A01K 1/00
(Continued)

(56) References Cited

U.S. PATENT DOCUMENTS 3,994,259 A * 11/1976 Sakamura .............. A01K 67/04
119/270
2004/0261724 A1* 12/2004 Tokas ..................... A01K 67/30
119/51.01
(Continued)

FOREIGN PATENT DOCUMENTS

CN           106472432 A    *  3/2017
DE    202016007438 U1    *  2/2017
(Continued)

OTHER PUBLICATIONS

Osaki, "Animals Teach Science on Natural Fibers:—Spider's Silks, Bagworm's Silks, and Collagen Fibers—", Journal of the Society of Fiber Science and Technology, 2002, vol. 58, No. 3, pp. 74-78, Partial English Translation 3 Pages.
(Continued)

*Primary Examiner* — Zoe Tam Tran
(74) *Attorney, Agent, or Firm* — Lucas & Mercanti, LLP

(57) ABSTRACT

A nest material useful in bagworm rearing is provided which can be stably supplied, is hygienic, and has high efficiency for nest building. A bagworm nest material including a bark having a specific shape and size in accordance with the stage of growth of a bagworm is also provided.

3 Claims, 8 Drawing Sheets

A

B

C

(58) Field of Classification Search
USPC ............................... 119/416, 270, 6.5; 449/4
See application file for complete search history.

(56) References Cited

U.S. PATENT DOCUMENTS

2007/0218804 A1* 9/2007 Allan .................... A01K 49/00
449/4
2020/0157706 A1  5/2020 Kameda et al.

FOREIGN PATENT DOCUMENTS

| EP | 3647470 A1 | 5/2020 |
| EP | 3733937 A1 | 11/2020 |
| JP | 2018074951 A | 5/2018 |
| WO | 2019003364 A1 | 1/2019 |

OTHER PUBLICATIONS

Akao, "Bagworm in the Vineyard", TSUNO WINE, 2012, 7 pages, Partial English Translation 1 page. Retrieved Internet: <URL: https://tsunowine.com/making/2012/04/30/>.
International Search Report for Corresponding International Application No. PCT/JP2022/024452, 2 pages, Aug. 9, 2022.
Supplementary European Search Report for Corresponding European Patent Application No. 22825107.0, Apr. 2, 2025, 9 pages.
Office Action issued for the related Japanese patent application No. 2023-530449, issued on Oct. 14, 2025, 3 pages.
"Cork products such as cork sheets and cork granules," Nagayanagi Co., Ltd., Apr. 10, 2021, https://web.archive.org/web/20210410110155/https://www.nagayanagi.co.jp/product/cork.html, with English translation, 12 pages.

* cited by examiner

Fig. 6
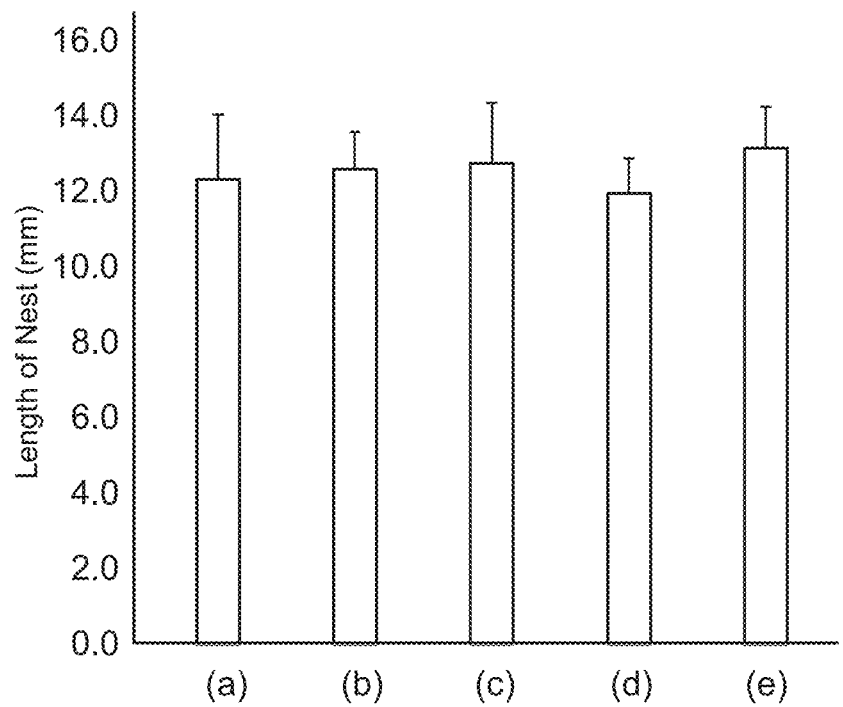
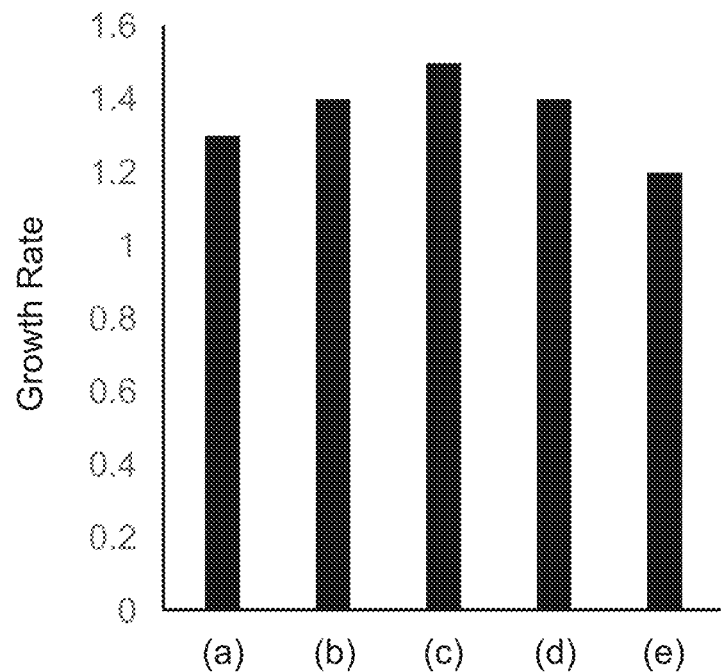

Fig. 8
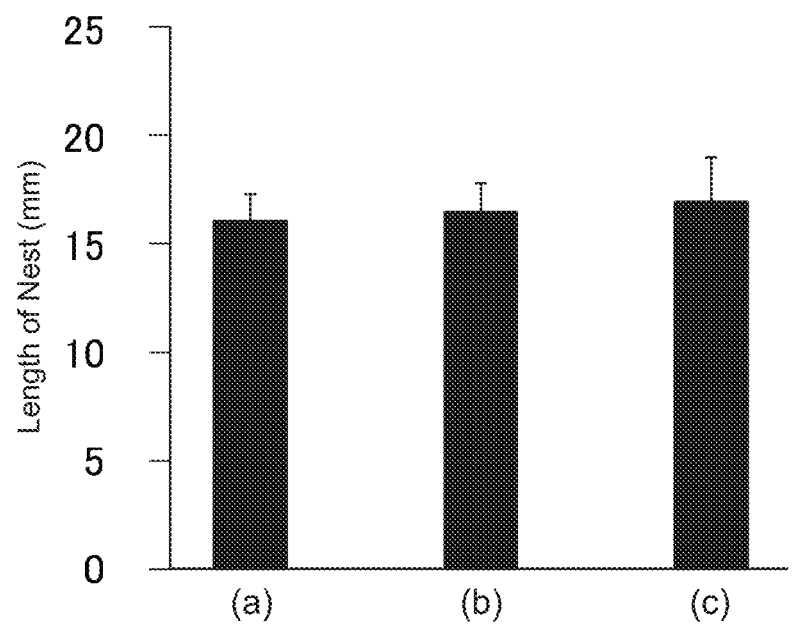
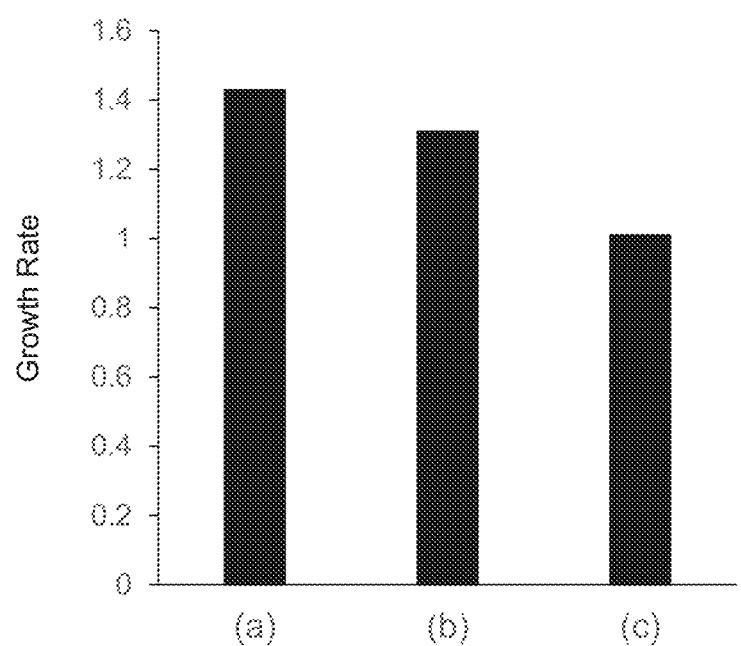

BAG WORM NEST MATERIAL

CROSS-REFERENCE TO RELATED APPLICATIONS

This application is a 371 of PCT/JP2022/024452, filed Jun. 20, 2022, which claims the benefit of Japanese Patent Application No. 2021-101905, filed Jun. 18, 2021.

TECHNICAL FIELD

The present invention relates to a bagworm nest material and a method of assisting a bagworm in building a nest using the same.

BACKGROUND ART

The term "bagworm" collectively refers to a moth larva belonging to the family Psychidae in the order Lepidoptera. A bagworm silk thread spun by this bagworm has higher properties than a silk thread spun by a silkworm, and hence, has been attracting attention as a promising novel animal natural fiber in recent years (Patent Literature 1 and Non-Patent Literature 1).

The bagworm silk thread industry has just begun, and a rearing technology is still under development. Because of this, obtaining a bagworm relies exclusively on collection on the field. However, in the commercialization, the mass rearing, the transgenerational breeding, and the like of bagworms are vital, and hence, it is imperative to establish a bagworm rearing technology.

It is possible to apply, to bagworm rearing, a silkworm rearing technology already established in the sericultural industry, as a silkworm belongs to the same order Lepidoptera as that of a bagworm. However, because of the difference in ecology, there are many respects in which a silkworm rearing technology cannot be utilized. One of the respects is nest building. A silkworm does not build a nest, but a bagworm builds a nest. In addition, a bagworm spends its whole larval stage living with a nest, and hence, the nest is vital for a bagworm to survive. Therefore, the nest is also an important factor for an efficient rearing of a bagworm.

A bagworm starts building a nest immediately after hatching, for itself to be protected, kept warm, and kept humid. In general, a bagworm immediately after hatching builds a nest by chipping off pieces from the surface of a bark and the surface of a leaf, and assembling the pieces with a thread spun by the bagworm itself. In principle, a nest once produced is never exchanged, and used throughout the whole larval stage during which the nest is repaired and expanded repeatedly as the larva grows. Accordingly, it is essential for the mass rearing of bagworms to supply a nest material suitable for each stage of growth. However, a nest material optimal for bagworm rearing has not been developed yet.

A bagworm can utilize, as a nest material, twigs and leaves provided for feeding. However, in the mass rearing of bagworms, an artificial diet is fed to stably supply food of a given quality, and neither twigs nor leaves are fed. When no suitable nest material is available in the rearing with an artificial diet, a bagworm utilizes artificial food as a nest material. However, when a fresh artificial diet is used as a nest material, the nest tends to be humidified with the moisture of the artificial diet. Thus, in ordinary rearing, a sanitary problem due to the generation of mold or rot is caused. On the other hand, an artificial diet is dried after an elapse of several days. Using such a dried artificial diet as a nest material causes a problem in that the artificial diet is powderized to collapse the nest.

A bagworm which has been artificially taken out of a nest and made wholly uncovered, namely, naked will promptly start a nest building action. In this case, the bagworm uses small pieces of matter from the bagworm's surroundings as alternative nest materials to pieces of leaves and pieces of twigs. Child's play making use of this habit is known since old time, that is, providing a naked bagworm with small pieces of colored paper and wool waste as nest materials, and allowing the bagworm to make a colorful nest. Accordingly, other than twigs and leaves, small pieces of paper, wool waste, or an artificial material such as pieces of plastic can provide a nest material for a bagworm. However, such a nest material is only temporary for a bagworm. In reality, such a nest material is accompanied by various problems, and hard to regard as a nest material optimal for rearing. For example, small pieces of paper, when wetted by water, become flexible, decreasing the rigidity of a nest markedly. In addition, wool waste has high hygroscopicity, and thus tends to make the inside of a nest humid, causing stuffiness and a disease. On the other hand, the present inventors have verified through an experiment that, when a plastic film or small plastic pieces are provided as a nest material, a bagworm bites or chips pieces off the material with its mandibles, during which the fine broken pieces are taken into the body through the mouthparts, and accumulated in the intestines, resulting in a cause of death.

CITATION LIST

Patent Literature

Patent Literature 1: WO2019/003364A1

Non-Patent Literature

Non-Patent Literature 1: Shigeyosi Ohsaki, 2002, Sen'i Gakkaishi (Journal of the Society of Fiber Science and Technology, Japan) (Sen'i To Kogyo (Textile and Industry)), 58: 74-78

SUMMARY OF INVENTION

Technical Problem

A problem to be solved by the present invention is to develop a nest material that, in bagworm rearing, can be supplied stably, is hygienic, and has a high efficiency of nest building.

Solution to Problem

To solve the above-described problems, the present inventors provided a bagworm with various kinds of candidate nest materials, and have searched for a nest material that a bagworm can utilize efficiently for nest building. The results have revealed that bark, particularly cork, is suitable as a nest material for a bagworm. In addition, it has been revealed that, even if the same bark is used, the size and shape preferred for a nest material vary according to the stage of growth. It has also been revealed that providing a suitable nest material in accordance with the stage of growth has a significant influence on not only the survival rate of a bagworm but also the growth rate, and that the nest material has the effect of facilitating the growth of a bagworm. The present invention is based on these novel findings, and provides the following items.

(1) A bagworm nest material comprising a bark, and being different in shape in accordance with a stage of growth of a bagworm, wherein the nest material for an initial-stage bagworm is regardless of shape, wherein the nest material for a middle-stage bagworm is a particulate nest material having a longitudinal diameter of from 0.3 mm to 5.0 mm, and wherein the nest material for a late-stage bagworm is a plate-like nest material.

(2) The bagworm nest material according to (1), further comprising a plate-like nest material as the nest material for the middle-stage bagworm, and a block-like nest material as the nest material for the late-stage bagworm.

(3) A bagworm nest material for all stages of growth, comprising: a particulate nest material having a longitudinal diameter of from 0.3 mm to 5.0 mm; and a plate-like nest material, wherein each nest material comprises a bark.

(4) The bagworm nest material according to any one of (1) to (3), wherein the bark is a cork.

(5) The bagworm nest material according to any one of (1) to (4), wherein the bagworm nest material is disinfected or sterilized.

(6) A method of assisting a bagworm in building a nest, comprising providing the bagworm with the bagworm nest material according to (1) or (2) in accordance with a stage of growth of the bagworm.

(7) A method of assisting a bagworm in building a nest, comprising providing the bagworm with the bagworm nest material according to (3) in all stages of growth of the bagworm.

(8) The method of assisting a bagworm in building a nest according to (6) or (7), wherein the bark is a cork.

(9) The method of assisting a bagworm in building a nest according to any one of (6) to (8), wherein the nest material is disinfected or sterilized.

(10) A bagworm nest comprising a particulate nest material composed of a cork, wherein the particulate nest material has a longitudinal diameter of from 0.3 mm to 5.0 mm.

The present specification encompasses the contents disclosed in the specification and/or drawings of Japanese Patent Application No. 2021-101905, on which the priority of the present application is based.

Advantageous Effects of Invention

A bagworm nest material according to the present invention can be provided stably in a hygienic state in bagworm rearing, with which nest material a bagworm can build a nest efficiently in accordance with the stage of growth.

A method of assisting a bagworm in building a nest according to the present invention can increase the efficiency of nest building and the survival rate in bagworm rearing, and also facilitate the growth of a bagworm.

BRIEF DESCRIPTION OF DRAWINGS

FIG. 2A shows a nest built by an initial-stage bagworm. It is understood that a particulate nest material (cork) (denoted by an arrow) provided was further finely chipped by the bagworm itself into powder, which was utilized as a nest material. FIG. 2B shows a nest built by a third-instar middle-stage bagworm. It is understood that a particulate nest material provided was utilized directly or in slightly processed form. FIG. 2C shows a nest built by a late-stage bagworm. It is understood that a cork sheet (denoted by an arrow) provided was roughly chipped into small pieces, which were utilized as a nest material.

FIG. 6 shows the relationship between the particle size of the cork particles and the growth rate. FIG. 6A is a graph showing the length (length of the long axis) of a nest at the start of an experiment in each test section. FIG. 6B shows the growth rate, and shows a relative value of the length of a nest on the 7th day in the nest building, assuming that the length of the nest is 1 at the start of the experiment. In both of FIG. 6A and FIG. 6B, (a) represents the first test section, (b) represents the second test section, (c) represents the third test section, (d) represents the fourth test section, and (e) represents the fifth test section.

FIG. 8A shows the length of a nest at the start of an experiment in Example 5. In the graph, the results obtained when the different nest materials were used are represented, where the nest material of the first test section (a) was cork particles having a particle size of approximately 3 mm, the nest material of the second test section (b) was 3 mm pieces of paper filter, and the nest material of the third test section (c) was plastic beads having a diameter of 3 mm. FIG. 8B shows the growth rate, and shows a relative value of the length of a nest on the 9th day in the nest building, assuming that the length of the nest is 1 at the start of the experiment. Here, (a) to (c) are the same as in FIG. 8A.

DESCRIPTION OF EMBODIMENTS

1. Bagworm Nest Material 1-1. Overview

Figure 1:
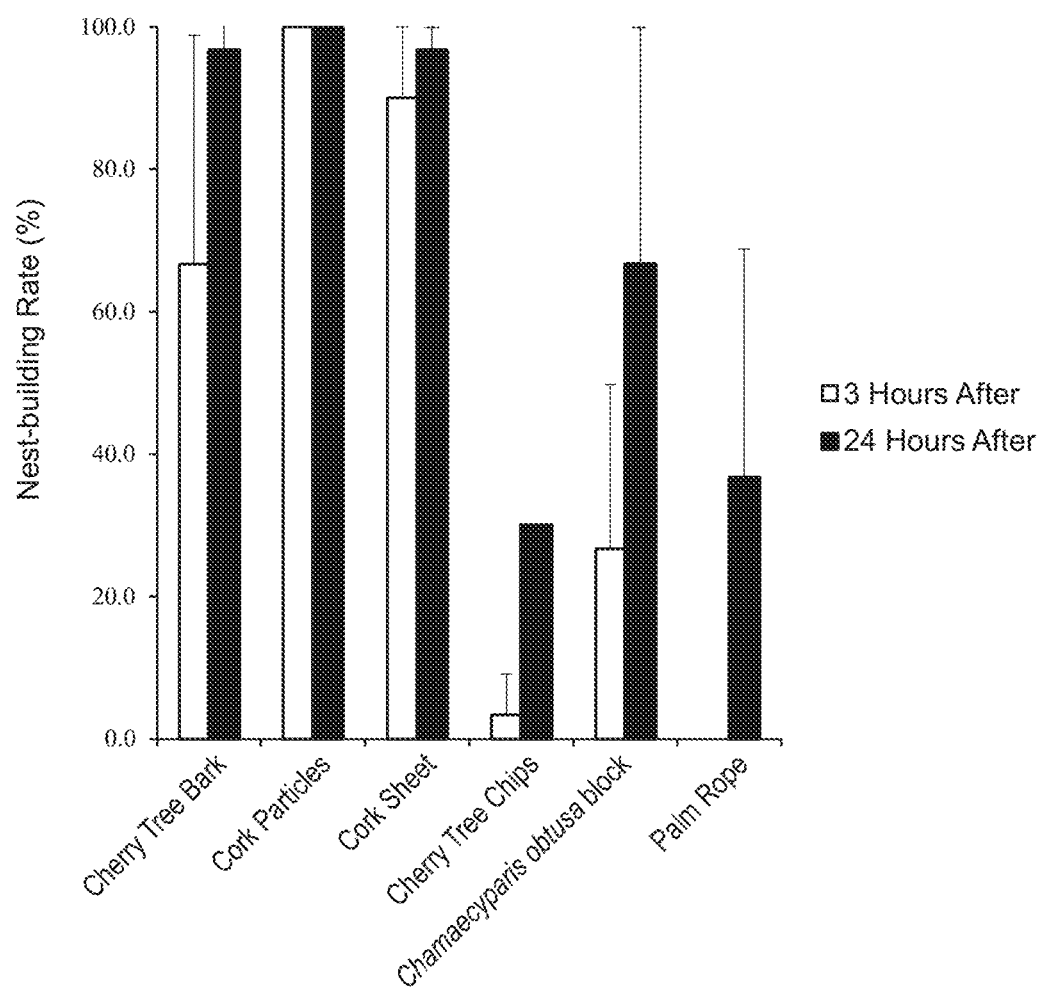
FIG. 1 shows the nest material preference of an initial-stage bagworm (*Eumeta japonica*) after hatching. The preference was determined from the nest-building rates obtained 3 hours and 24 hours after the bagworm was provided with a nest material.

A first aspect of the present invention is a bagworm nest material. The bagworm nest material in the present aspect has a shape optimized to enable a bagworm to efficiently utilize the material in accordance with the stage of growth, and is constituted by a raw material comprising a bark suitable for bagworm rearing. A bagworm nest material according to the present invention can provide a bagworm rearing nest material that is hygienic, can be supplied stably, and can be efficiently utilized by a bagworm.

1-2. Definition

The following terms frequently used herein are defined as described below.

The term "bagworm" collectively refers to a moth larva belonging to the family Psychidae in the order Lepidoptera, as described above. Moths of family Psychidae are distributed all over the world. A bagworm as a subject in the present specification may be of any species. Examples comprise, but are not limited to, species belonging to *Acanthopsyche, Anatolopsyche, Bacotia, Bambalina, Canephora, Chalioides, Dahlica, Diplodoma, Eumeta, Eumasia, Kozhantshikovia, Mahasena, Nipponopsyche, Paranarychia, Proutia, Psyche, Pteroma, Siederia, Striglocyrbasia, Taleporia, Theriodopteryx, Trigonodoma*, and the like. In addition, a bagworm as a subject in the present specification is regardless of sex and instar.

As used herein, the term "stage of growth" refers to any of the criteria classified according to the degree of growth of a bagworm. In the present specification, the criteria are classified into three stages: the initial stage, middle stage, and late stage. The bagworms in the respective stages of growth are referred to as an initial-stage bagworm, middle-stage bagworm, and late-stage bagworm respectively.

As used herein, the term "initial-stage bagworm" refers to a bagworm in the initial stage of growth. Without limitation, a bagworm corresponding to the initial-stage bagworm is a bagworm that builds a nest having a longitudinal diameter of 1 mm or more and less than 10 mm, and is generally in the first instar immediately after hatching to second instar. The term "initial-stage bagworm group" refers to the group consisting of a plurality of individual initial-stage bagworms. The degrees of growth of the individuals constituting the group may be the same or different. Example of bagworms different in the stage of growth comprise the initial-stage bagworm group consisting of individuals in the late stage of the first instar and in the second instar.

As used herein, the term "middle-stage bagworm" refers to a bagworm in the middle stage of growth. Without limitation, a bagworm corresponding to the middle-stage bagworm is a bagworm that builds a nest having a longitudinal diameter of 10 mm or more and less than 20 mm, and is generally in the third instar to the fourth instar. The term "middle-stage bagworm group" refers to the group consisting of a plurality of individual middle-stage bagworms. The degrees of growth of the individuals constituting the group may be the same or different.

As used herein, the term "late-stage bagworm" refers to a bagworm in the late stage of growth. Without limitation, a bagworm corresponding to the late-stage bagworm is a bagworm that builds a nest having a longitudinal diameter of 20 mm or more, and is generally in the fifth and subsequent instars. The term "late-stage bagworm group" refers to the group consisting of a plurality of individual late-stage bagworms. The degrees of growth of the individuals constituting the group may be the same or different.

As used herein, the term "nest (of a bagworm)" refers to a bag-like movable living place that accommodates the whole body of a bagworm in, for example, spindle-shaped, cylinder-shaped, or cone-shaped form. The nest is composed of a silk thread spun by the bagworm itself and the raw materials, such as leaves and twigs, which are assembled with the silk thread. A bagworm basically lies hidden in a nest throughout the whole larval stage, and does not leave the nest. A bagworm exposes only part of the insect body through the opening of the nest even during eating and migrating, and always carries the nest with the bagworm. In addition, a bagworm usually does not exchange a nest in the stage from the first instar to the last instar. The nest produced during the first instar is repaired and expanded repeatedly in accordance with the growth, and thus continues to be utilized. In addition, a bagworm does not produce a cocoon but pupates in a nest. As above-described, a bagworm and a nest are in one integral and indivisible relationship.

As used herein, the term "building a nest (nest building)" means that a bagworm produces a nest. As above-described, a bagworm does not exchange a nest produced immediately after hatching, and uses the nest throughout the whole larval stage during which the nest is repaired and expanded repeatedly as the larva grows. Accordingly, the nest building in the present specification refers to nest building in a broad sense, comprising not only producing a nest from nothing but also repairing or expanding an existing nest to maintain the optimal state of a nest. The term "repairing or expanding a nest" refers to extending a nest in accordance with the state of a nest and the growth of a bagworm, or mending a damaged portion. Repairing or expanding a nest is usually performed by adding a new nest material, reinforcing the nest with a bagworm silk thread, or the like.

As used herein, the term "silk thread" refers to a proteinous thread derived from an insect, and spun by the insect in the larval or adult stage for the purpose of nest building, migration, anchoring, cocooning, prey capture, and the like. In addition, the term "bagworm silk thread" as used herein refers to a silk thread spun by a bagworm.

As used herein, the term "nest material" refers to a component of a nest of a bagworm, and is a substance that the bagworm incorporates from the outside during nest building. A bagworm usually wears plant leaves and small pieces of twigs on the surface of its nest for the purpose of camouflage, reinforcement, or the like. In nature, these plant leaves and small pieces of twigs provide the nest material. In the present specification, the nest material comprises any substance that is artificially supplied in a rearing environment, and utilized as a nest material by a bagworm. Examples comprise bark, wood, paper, resin, fiber, fur, and the like. Among these, bark is a component (raw material) essential for a nest material in the present aspect.

The term "bark" refers to a cork tissue composed of a cork layer the position of which is outside of the cork cambium in a trunk, branch, and root of a woody plant. The term "woody plant" refers to a perennial plant having a cambium that lignifies. What is called a tree corresponds to the woody plant. The cork layer is constituted by cork cells that are dead cells. The tree species from which a bark is derived is not limited, and a dicotyledonous plant or a gymnospermous plant is preferable. The species thereof is not limited. Examples of the dicotyledonous plant comprise plants belonging to Fagales, Juglandales Hamamelidales, Laurales, Ebenales, Salicales, Ericales, Rosales, Sapindales, and the like. In addition, examples of the gymnospermous plant comprise: plants belonging to Coniferales, Taxales, Cycadales, and the like; and *Ginkgo biloba*. A bark of a Fagaceae plant or a Pinaceae plant, which has a thick cork layer, is suitable. Among these, a bark of a *Quercus* plant and a bark of a *Pinus* plant are more preferable as a bark in the present specification. Particularly preferable are a bark of *Q. suber* and a bark of *Q. variabilis*. What is called "cork" is an unprocessed bark or a processed bark of *Q. suber*.

A bark in the present specification encompasses both of a processed bark and an unprocessed bark. The term "processed bark" refers to a bark that is ground, cut out, or sliced, and if necessary, molded after being harvested. Examples comprise: cork powder obtained by crushing a cork composed of a bark of *Q. suber* into particles: cork chips obtained by comminuting the cork into small pieces: a cork sheet or a cork mat, obtained by compressing the cork powder or cork chips into a plate-like shape: a cork stopper obtained by cut-out processing the cork: bark chips obtained by crushing the cork into blocks; and the like.

1-3. Constitution

The bagworm nest material in the present aspect comprises a bark as a main component (main raw material). The bark is preferably derived from a dicotyledonous plant or an angiospermous plant. The bark may be a bark of a single species of tree, or may be a bark mixture of a plurality of species of trees. Without limitation, a cork that is easily available, has a relatively constant quality, and is inexpensive is suitable as a bark for a nest material. A bagworm nest material according to the present invention may be constituted by bark alone, or can comprise another raw material as an auxiliary component (auxiliary raw material). Examples comprise fiber, fur, paper, resin, and the like. In a case where the nest material in the present aspect is composed of a plurality of species of raw materials, providing a bagworm with the nest material allows the bagworm to utilize the bagworm's favorite material(s) from among the raw materials, and build a nest.

The bagworm nest material in the present aspect may be disinfected or sterilized. As used herein, the term "disinfection" refers to a treatment the purpose of which is to decrease the number of surviving bacteria and viruses coexisting in an object of interest, and thereby deactivate the infectivity of, or detoxicate, the bacteria and viruses. In addition, the term "sterilization" as used herein refers to a treatment that brings the probability of surviving bacteria and viruses coexisting in an object of interest to $1/1,000,000$ or less, preferably 0. A bagworm nest material disinfected or sterilized leads to the prevention of infection of a bagworm, and thus, is suitable. The bagworm nest material is preferably used particularly for a bagworm during hatching because such a bagworm has low resistance. A method of disinfecting or sterilizing a bagworm nest material can be performed by a method known in the art. Examples of a method of disinfection comprise: hot-water disinfection based on exposure to hot water of 60° C. to 100° C. for a predetermined time: washing disinfection based on using a surfactant; disinfection based on exposure to a disinfectant such as alcohol or sodium hypochlorite; and the like. In addition, examples of a method of sterilization comprise a high-pressure steam sterilization method (autoclaving method), boiling sterilization method, ethylene oxide gas sterilization method, gamma beam sterilization method, and the like.

The bagworm nest material in the present aspect is characterized in that a bark as a main component differs in shape and size in accordance with the stage of growth of a bagworm. The bagworm nest materials are classified into a nest material for an initial-stage bagworm, nest material for a middle-stage bagworm, and nest material for a late-stage bagworm in accordance with the stage of growth. In addition, the nest materials obtained by combining the nest materials for the respective stages of growth can also be used in all the stages of growth. Each of the nest materials will be specifically described below.

(1) Nest Material for Initial-Stage Bagworm

As used herein, the term "nest material for an initial-stage bagworm" refers to a nest material suited for a bagworm in the initial stage.

The studies of the present inventors have revealed that an initial-stage bagworm achieves the highest nest-building rate when provided with a bark as a nest material. In addition, it has been revealed that, in this stage, a nest material in any of a particulate, a plate-like, and a block-like shape can be suitably utilized, regardless of shape. This is because, when a nest material in any shape is supplied, an initial-stage bagworm does not directly utilize the nest material provided, but further chips, with its mouthparts, the surface of the nest material off into pieces in the shape having a size preferred by the bagworm itself, and utilizes the pieces as a nest material.

Accordingly, the shape and size of each of the nest materials constituting a nest material for the initial-stage bagworm are not limited, and the nest materials may be the same or different in size and shape as long as the nest materials comprise a bark. On the other hand, a bagworm in the initial-stage has smaller mouthparts and a weaker biting power, and thus, hard wood and tough fiber are difficult to utilize as nest materials. In view of this, a bark that is relatively soft and easy to chip, for example, a corky portion of a bark of a dicotyledonous plant or a gymnospermous plant is suitable.

(2) Nest Material for Middle-Stage Bagworm

As used herein, the term "nest material for a middle-stage bagworm" refers to a nest material suited for a bagworm in the middle stage.

The studies of the present inventors have revealed that, also for a middle-stage bagworm, a bark is a suitable nest material. However, it has also been revealed that, differently from an initial-stage bagworm, a middle-stage bagworm has preference in shape and size. In the most suitable shape, the nest material for a middle-stage bagworm is a particulate nest material having a specific size.

The term "particulate nest material" refers to a nest material having a particulate shape. The particulate shape is not particularly limited, and comprises any shape such as a spherical, a generally spherical, a square, a generally square, or an indefinite shape. The particulates may be uniform or different in shape and size. Specific examples comprise a bark ground into powder or particles. When a nest material has such a particulate shape, a middle-stage bagworm utilizes the nest material provided directly without being processed or with being processed slightly, for example, chipped partially. This makes it possible to greatly decrease the nest building labor of a bagworm, and markedly increase the nest-building rate.

For the above-described reasons, it is preferable that the nest material for a middle-stage bagworm comprises a bark as a main component, and has a particulate shape. In the size of the particulate nest material, the longitudinal diameter can be in the range of 0.3 mm or more and 5.0 mm or less, 0.5 mm or more and 4.5 mm or less, 0.8 mm or more and 4.0 mm or less, 1.0 mm or more and 3.5 mm or less, or 1.5 mm or more and 3.0 mm or less. A particulate nest material having a longitudinal diameter of approximately 3.0 mm, that is, 2.0 mm or more and 4.0 mm or less, or 2.5 mm or more and 3.5 mm or less not only increases the nest-building rate but also significantly increases the speed of rearing a bagworm, and thus, is particularly preferable as the nest material for a middle-stage bagworm. On the other hand, a microparticulate nest material having a longitudinal diameter of less than 0.3 mm can also be utilized as a nest material, but decreases in the growth rate of a bagworm, compared with a particulate nest material having the above-described specific size. As used herein, the term "longitudinal diameter" refers to the longest distance between any two ends of a nest material. For example, when a nest material is substantially in the shape of a sphere, the diameter of the sphere corresponds to the longitudinal diameter of the nest material. Examples of the particulate nest material comprise bark particles obtained by crushing a bark into a predetermined size, for example, cork particles and the like. When a middle-stage bagworm is provided with a particulate nest material, for example, cork particles, having a longitudinal diameter of 0.3 mm or more and 5.0 mm or less, the nest has a characteristic shape in which the particulate nest material is attached to the surface of the nest directly or in a slightly processed form such as hardly causes a change in shape.

In addition, a middle-stage bagworm can utilize a plate-like nest material besides a particulate nest material. The term "plate-like nest material" refers to a relatively thin sheet-like nest material. The area of the sheet is not limited, and preferably has a length equal to or longer than the body length of a bagworm in both length and width. As below-described, a bagworm tears the sheet into pieces in optimal shape, and hence, a nest material to be provided may have any sheet-like shape. The shape may be any of a square, a generally square, a circular, a generally circular, a polygonal, a generally polygonal, and an amorphous shape. In addition, the thick is not limited, and can be from 0.2 mm to 10 mm, from 0.5 mm to 8 mm, from 0.8 mm to 8 mm, from 1 mm to 6 mm, from 2 mm to 5 mm, or from 3 mm to 4 mm. Examples of the plate-like nest material comprise a bark layer obtained by slicing a bark, a cork sheet obtained by crushing a bark into bark particles, and squeezing the particles into a sheet-like shape, and the like.

A plate-like nest material is too large to be directly utilized as a nest material, and hence, a bagworm tears the plate-like nest material into pieces in a shape having a size preferred by the bagworm itself. The plate-like nest material requires a nest building labor, and has an accordingly poorer nest-building rate than the particulate nest material. Accordingly, when the middle-stage bagworm is provided with a nest material that is a plate-like nest material, the nest material is preferably provided in combination with the particulate nest material.

(3) Nest Material for Late-Stage Bagworm

As used herein, the term "nest material for a late-stage bagworm" refers to a nest material suited for a bagworm in the late stage.

The studies of the present inventors have revealed that, when provided with a bark as a nest material, a late-stage bagworm also achieves the highest nest-building rate in the same manner as an initial-stage bagworm and a middle-stage bagworm. However, it has been revealed that, as the shape of a nest material, a plate-like shape is more suitable than a particulate shape. A late-stage bagworm has larger mouthparts and a stronger biting power. Accordingly, even if provided with a plate-like nest material, the bagworm can chip the nest material into pieces in a shape having a size suitable for the stage of growth of the bagworm itself to reprocess the pieces, and utilize the pieces as a nest material. On the other hand, a particulate nest material suitable for a middle-stage bagworm can be utilized as a nest material for a late-stage bagworm, but may be too small to be suitable.

For the above-described reasons, it is preferable that the nest material for a late-stage bagworm comprises a bark as a main component, and has a plate-like shape.

In addition, a late-stage bagworm can utilize a block-like nest material besides a plate-like nest material. The term "block-like nest material" refers to a nest material in the shape of a block having a regular or amorphous shape. The size and volume of the block-like nest material are not limited, and the length, width, and height can each be in the range of from 1 cm to 15 cm, from 2 cm to 12 cm, from 4 cm to 10 cm, or from 5 cm to 5 cm. Specific examples of the block-like nest material comprise a cork stopper and bark chips.

(4) Bagworm Nest Material for All the Stages of Growth

As used herein, the term "bagworm nest material for all the stages of growth" refers to a nest material suited for all the stages of growth of a bagworm.

As above-described, a suitable nest material for a bagworm differs in shape in accordance with the stage of growth. A bagworm nest is repaired and expanded throughout the larval stage, and thus, a bagworm has to be continuously provided with a nest material throughout the rearing period. Accordingly, a nest material needs to be exchanged in accordance with the growth of the bagworm. However, in a case where the number of bagworm individuals to be reared is large, the speed of growth can have an individual difference. For example, when, in the rearing of a plurality of bagworms, middle-stage bagworms have grown, and some of them have become late-stage bagworms, the late-stage bagworms and the middle-stage bagworms result in coexisting, and it is difficult to determine at which timing a nest material should be exchanged. In addition, the exchange itself of a nest material requires labor.

A bagworm nest material for all the stages of growth can be used for all the stages of growth ranging from an initial-stage bagworm up to a late-stage bagworm, and can provide an optimal nest material in each stage of growth, and thus, does not require the exchange of nest materials. Because of this, the above-described problems do not arise.

A bagworm nest material for all the stages of growth comprises: a particulate nest material having a specific size that is the nest material for a middle-stage bagworm; and a plate-like nest material that is a nest material for a late-stage bagworm. As described above, the raw materials for the nest materials in the different stages have a characteristic in common in that the nest materials all comprise a bark. In addition, an initial-stage bagworm is regardless of the shape of a nest material. Accordingly, the nest material can be constituted so as to be suitable for a middle-stage bagworm and a late-stage bagworm. A middle-stage bagworm can utilize a plate-like nest material suitable as a nest material for a late-stage bagworm. However, utilizing the plate-like nest material can cause a decrease in the growth rate and the nest-building rate, and thus, is not optimal. On the other hand, when a particulate nest material having a longitudinal diameter of 0.3 mm or more and 5.0 mm or less that is suitable as a nest material for a middle-stage bagworm is mixed with a plate-like nest material to form a nest material mixture, a middle-stage bagworm actively utilizes the particulate nest material efficient in nest building, and a late-stage bagworm utilizes the plate-like nest material. When a middle-stage bagworm has grown to a late-stage bagworm, the grown late-stage bagworm shifts to utilization of a plate-like nest material. That is, a bagworm nest material for all the stages of growth provides all the nest materials having a shape optimal for each stage of growth, and thus, a bagworm can select, from among the nest materials, a nest material suitable for the growth of the bagworm itself.

The ratio of the particulate nest material to the plate-like nest material in the bagworm nest material for all the stages of growth is not limited. The ratio can be suitably determined in accordance with the number of individuals to be reared and the ratio of the number of individuals in each stage of growth when the nest material is provided. For example, the ratio of a particulate nest material to a plate-like nest material can be 1:9, 2:8, 3:7, 4:6, 5:5, 6:4, 7:3, 8:2, or 9:1 by weight or by volume. In general, a late-stage bagworm requires a large amount of nest material. Thus, the higher the ratio of the plate-like nest material, the more preferable.

In this regard, the bagworm nest material for all the stages of growth may comprise a block-like nest material, if necessary.

2. Method of Assisting Bagworm in Building Nest

2-1. Overview

A second aspect of the present invention is a method of assisting a bagworm in building a nest. The present method is characterized in that, when a bagworm builds a nest, a nest material suitable for each stage of growth described in the first aspect is provided. According to the present method, a bagworm can build a nest efficiently in a short time, thus making it possible to decrease the nest building labor of the bagworm, and increase the survival rate and growth rate of the bagworm during rearing.

2-2. Method

A method of assisting in building a nest according to the present invention is characterized by providing different nest materials in accordance with the different stages of growth of a bagworm during rearing.

As used herein, the term "assisting in building a nest" refers to assisting in decreasing the labor to be performed by a bagworm to build a nest, and enabling the bagworm to build a nest efficiently in a short time.

In a method of assisting in building a nest according to the present invention, a bagworm nest material described in the first aspect is used.

Specifically, a nest material comprising a bark and having any shape can be used in the rearing of an initial-stage bagworm, and hence, such a nest material can be disposed in a rearing container, ranging from a nest material for the start of the nest building of a first instar bagworm immediately after hatching to a nest material for repair or expansion.

In the rearing of a middle-stage bagworm, a particulate nest material having a longitudinal diameter of from 0.3 mm to 5.0 mm or a plate-like nest material can be disposed as the nest material for repair or expansion in a rearing container.

In the rearing of a late-stage bagworm, a plate-like nest material and/or a block-like nest material can be disposed as the nest material for repair or expansion in a rearing container.

In this regard, when bagworms in different stages of growth coexist in a rearing container, a mixture of nest materials having different shapes and sizes suitable for the different stages of growth can be provided. In this case, each bagworm utilizes a nest material having a size and shape preferred by the bagworm itself in accordance with the stage of growth of the bagworm. Alternatively, a nest material having a shape common to the different stages of growth may be provided. For example, a nest material for an initial-stage bagworm is regardless of shape as long as the nest material comprises a bark. A nest material for a middle-stage bagworm can be a nest material that comprises a bark, and is either a particulate nest material having a longitudinal diameter of from 0.3 mm to 5.0 mm or a plate-like nest material. Hence, disposing the particulate nest material having a longitudinal diameter of from 0.3 mm to 5.0 mm or the plate-like nest material in a rearing container makes it possible to rear a bagworm in any one of the initial stage of growth and the middle stage of growth.

In addition, when bagworms in all the stages of growth are mixed, and/or when nest materials are not exchanged for bagworms ranging from an initial-stage bagworm to a late-stage bagworm, the above-described bagworm nest material for all the stages of growth can be disposed in a rearing container. In this case, the nest material may be suitably added, if necessary.

In addition, the nest material comprising a bark is preferably disinfected or sterilized before being provided as a nest material. This makes it possible to make the nest material hygienic, and to decrease the death rate of a first instar larva that has just hatched and has a low resistance to miroorganism and the like.

In the present method, the time during which a nest material is to be provided is not particularly limited. The nest material is subsequently needed to repair or expand the nest after the nest is built, and thus, the nest material can be disposed as it is.

Effects

A method of assisting a bagworm in building a nest according to the present invention enables a bagworm to build a nest efficiently in a short time. In addition, a method of assisting a bagworm in building a nest according to the present invention makes it possible not only to decrease the nest building labor of a bagworm, and increase the survival rate of a bagworm during rearing, but also to facilitate the speed of growth of a bagworm. This can lead to shortening the period for rearing a bagworm, and to reducing the cost of rearing.

EXAMPLES

Example 1: Nest Material Preference of Bagworm (Purpose)

To identify a nest material preferable in the rearing of a bagworm, the nest material preference of a bagworm has been examined.

(Method)

The following six kinds of raw materials were used as the candidate nest materials for a bagworm.

(1) Cherry tree bark
  (pieces of bark chipped off using a cutter knife from a branch of a cherry tree planted in the fields: one teaspoon)
(2) Cork particles (commercially available cork particles, having a longitudinal diameter of approximately from 2 mm to 3 mm: one teaspoon)
(3) Cork sheet (a commercially available cork sheet, 40 mm in length×40 mm in width×2 mm in thickness)
(4) Cherry tree chips for smoking (commercially available particles from 3 to 5 mm: one teaspoon)
(5) *Chamaecyparis obtusa* block (a commercially available product, 5 mm in length×70 mm in width×3 mm in thickness: three pieces)

(6) Palm rope (a commercially available product, 4 mm in diameter×70 mm in length: three pieces)

The cork particles and the cork sheet were derived from a bark of *Q. suber* that is a dicotyledonous plant. The cherry tree chips were small pieces of wood (woody material) of a cherry tree that is a dicotyledonous plant. The *Chamaecyparis obtusa* block was obtained by drying a piece of wood of *Chamaecyparis obtusa* that is a gymnospermous plant, and then processing the piece into a block. The palm rope was obtained by processing, into rope shape, a fibrous portion obtained from a palm cortex of the genus *Trachycarpus* that is a monocotyledonous plant. The term "palm cortex" is a fibrous portion covering the trunk of a palm, and derived from the leaf sheath of the palm leaf base. This is only the residual fiber from a leaf sheath of an old palm leaf that withered and died. The palm cortex is not a bark.

In plastic dishes having a diameter of 9 cm, and having a filter paper spread therein, one kind of candidate nest material per dish and a small amount of artificial diet were disposed.

A bagworm used was an initial-stage *Eumeta japonica* larva that had spent 24 hours or less after hatching and had no nest built yet. In each dish, 10 individuals were placed, and allowed to build a nest at 24° C. 3 hours and 24 hours after the bagworms were disposed, the number of individuals that completed building a nest in each dish was counted, and the nest-building rate per the number of individuals placed was calculated. A shorter nest-building time taken to complete building a nest after a nest material was provided, and a higher nest-building rate in a given time can mean that the material is more suitable as a nest material for a bagworm. Each test was performed independently three times.

Results

The results are shown in FIG. 1. All of the cherry tree bark, cork particles, and cork sheet that were each constituted by a bark exhibited a nest-building rate of 60% or more 3 hours after the bagworms were disposed, and 24 hours after the disposition, the same materials each verified a nest-building rate as high as 90% or more. Furthermore, it has been revealed that any bark raw material, whether particulate or sheet-like in shape, can be utilized. On the other hand, the cherry tree chips and the *Chamaecyparis obtusa* block that were each wood did not reach a nest-building rate of 40% 3 hours after the bagworms were disposed, and even 24 hours after the disposition, the *Chamaecyparis obtusa* block only exceeded 60%. Furthermore, in the case of the fibrous palm rope, a nest was not built at all 3 hours after the bagworms were disposed, and at 24 hours after the disposition, the *Chamaecyparis obtusa* block only achieved less than 40%.

The above-described results have revealed that an initial-stage bagworm prefers a bark as a nest material. In particular, cork is suitable as a nest material, and achieved a nest-building rate of more than 90% in a time as short as 3 hours after the bagworms were disposed. On the other hand, it has been revealed that wood, if utilized in a longer nest-building time, can be utilized as a nest material, but is not an efficient raw material, compared with a bark. Furthermore, it has been revealed that the palm rope is not suitable as a bagworm nest material, compared with a bark.

Example 2: Preference in Shape of Nest Material in Each Stage of Growth of Bagworm (Purpose)

The nest material preference in each stage of growth of a bagworm was verified.

(Method)

As bagworms, the larvae of *Eumeta japonica* were used. Bagworms in each stage of growth were used as follows: the first instar larvae and the second instar larvae as initial-stage bagworms; the third instar larvae as middle-stage bagworms; and the fifth instar larvae as late-stage bagworms.

As a nest material, the cork that afforded suitable results in Example 1 was used. For initial-stage bagworms and middle-stage bagworms, commercially available cork particles having a longitudinal diameter of approximately from 2 mm to 3 mm, being the same as in Example 1, were used. In plastic dish having a diameter of 9 cm, and having a filter paper spread therein, one kind of nest material per dish and a small amount of artificial diet were disposed. For late-stage bagworms, the same commercially available cork sheet as in Example 1 was used. Acrylic cages, 210 mm in length×210 mm in width×120 mm in height, were provided, and an artificial diet having a thickness of 10 mm was attached to cover the whole ceiling face. A strip-like cork sheet was hung from the portion of placement of the artificial diet down to the floor face.

The bagworms in each stage of growth, 10 to 40 individuals, were placed in each of the dishes and the cages, and were allowed to build a nest. The state of each nest after 24 to 48 hours was observed.

(Results)

Figure 2:
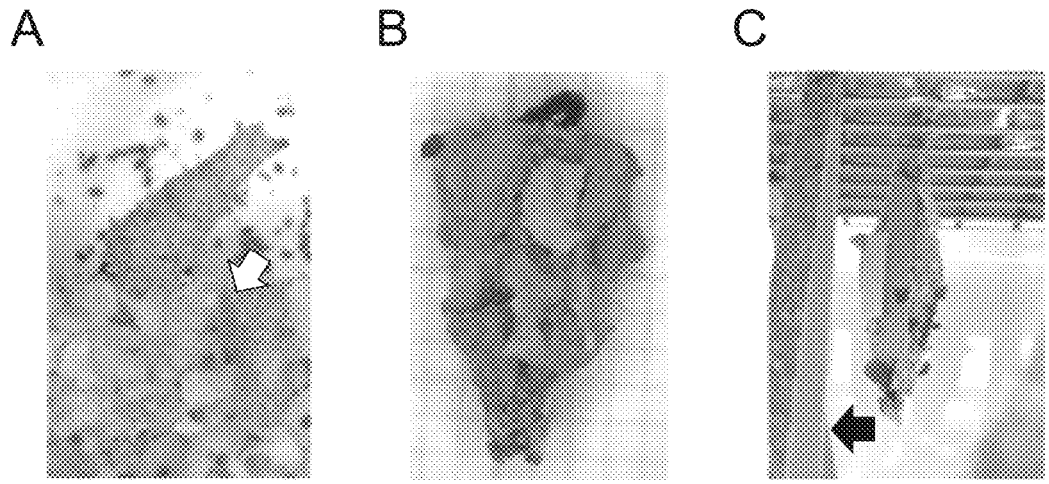
FIG. 2 shows the state of a nest in each stage of growth of a bagworm (*Eumeta japonica*) in a case when a cork nest material was utilized.

The results are shown in FIG. 2. The initial-stage bagworm shown in FIG. 2A did not directly use the cork particles provided (denoted by an arrow), but further chipped the surface, processed the resulting pieces into microparticles, and utilized the microparticles as a nest material. Differently from the initial-stage bagworm, the middle-stage bagworm shown in FIG. 2B utilized the cork particles as a nest material directly without being processed, or with being processed slightly but the cork particles still remained to be in the form of cork particles. The last-stage bagworm shown in FIG. 2C chipped, into small plate-like pieces, the surface of the cork sheet (denoted by an arrow) hanging from the ceiling in the cage, and utilized the pieces as a nest material.

Example 3: Relationship Between Nest Material and Each of Nest-Building Rate, Growth Rate, and Survival Rate (Purpose)

The influence that the kind and shape of a nest material had on the nest-building rate, growth rate, and survival rate was verified.

(Method)

The bagworms used were middle-stage bagworms (third instar larvae) of *Eumeta japonica*. The bagworms were reared with raw leaves until the initial-stage, and with an artificial diet instead from the middle-stage.

The nest material used in the test section 3 was as follows:
(a) The first test section: cork particles+cork sheet
(the cork particles were the same as used in Example 1, and the cork sheet was a commercially available cork sheet 125 mm in length×5 mm in width×0.5 mm in thickness.)
(b) The second test section: cork particles+KIMTOWEL
(the cork particles were the same as used in Example 1, and KIMTOWEL [Nippon Paper Industries Co., Ltd.] was 125 mm in length×5 mm in width×0.5 mm in thickness.)

(c) The third test section: cork sheet alone
(the same as used in Example 1)

For each test section, an acrylic cage, 210 mm in length× 210 mm in width×120 mm in height, was provided, and an artificial diet having a thickness of 10 mm was attached to cover the whole ceiling face. A strip-like bagworm nest material (a cork sheet or KIMTOWEL) was hung from the portion of placement of the artificial diet down to the floor face. In the second test section and the third test section, 35 cc of cork particles were placed on the floor face.

On the floor of each cage, 30 to 40 bagworm individuals having substantially the same size in the third instar period were placed. The individuals were reared at 24° C. for 14 days. After the start of the experiment, the ratio of the individuals that attached a new nest material to the nest was calculated every day, and the state of the nest material attached was observed. In addition, 23 days after the bagworms were placed, the length (length of the long axis) of the nest in each test section was measured. Furthermore, on the 7th day, 15th day, 23rd day, 32nd day, 40th day, 48th day, and 55th day after the bagworms were placed (the 0th day), the surviving individuals in each test section were counted, and the survival rate was calculated.

(Results)

Figure 3:
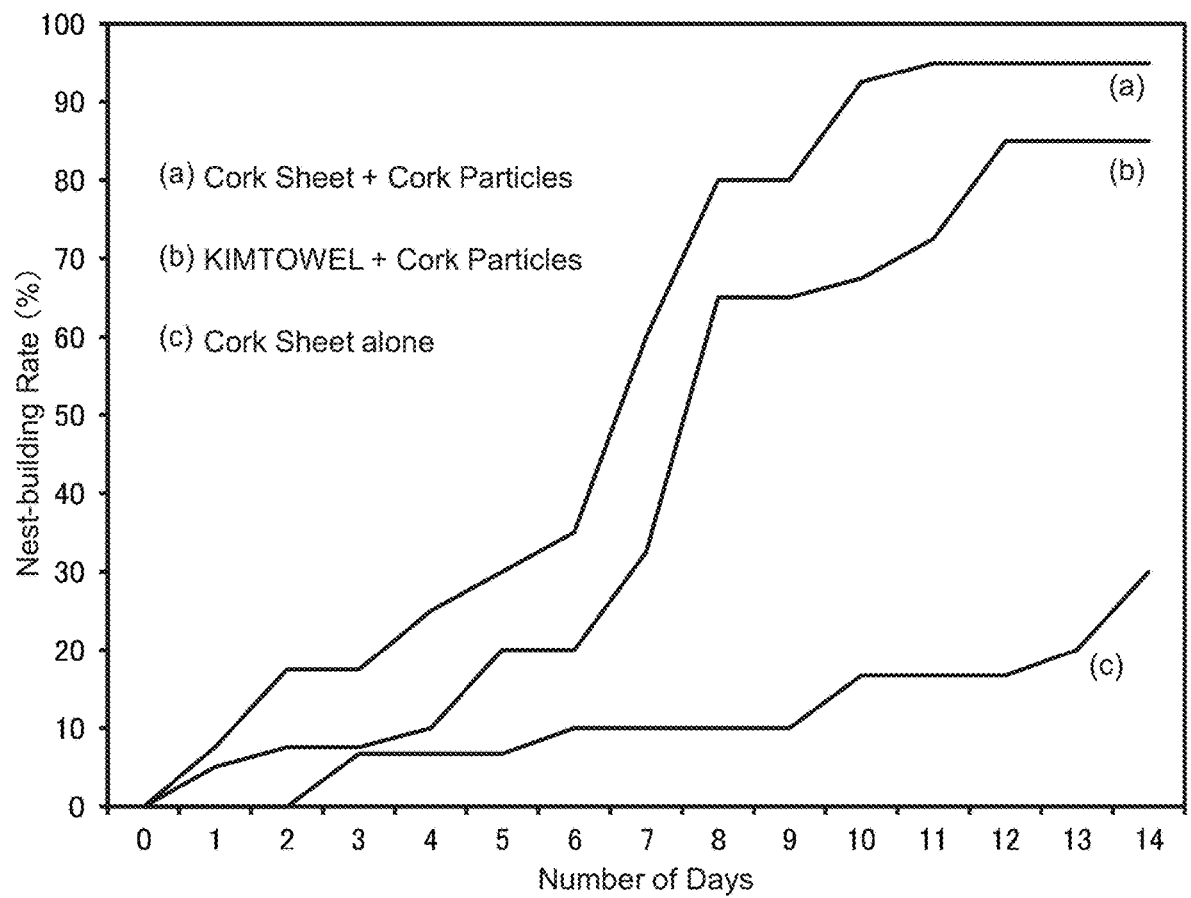
FIG. 3 shows the nest-building rates in Example 3. In the graph, the nest-building rates after the different nest materials were provided (the 0th day) are illustrated, where the nest material of the first test section (a) was cork particles and a cork sheet, the nest material of the second test section (b) was cork particles and KIMTOWEL, and the nest material of the third test section (c) was a cork sheet alone.
Figure 4:
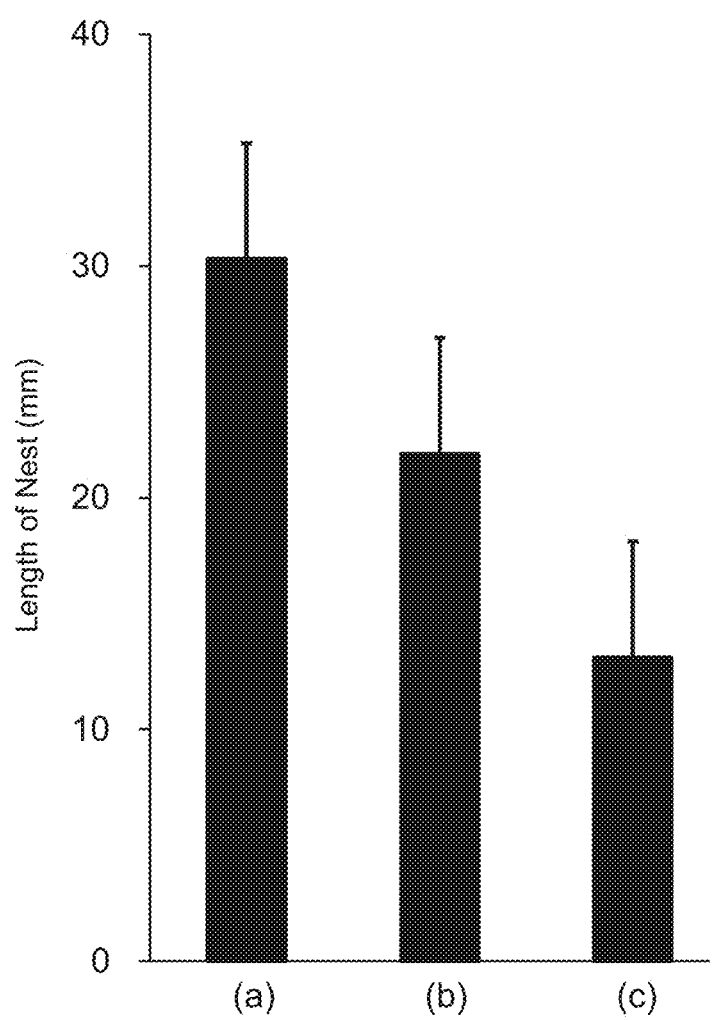
FIG. 4 shows the growth rates in Example 3. In the graph, the lengths (lengths of the long axes) of the nests measured 21 days after the different nest materials were provided are illustrated, where the nest material of the first test section (a) was cork particles and a cork sheet, the nest material of the second test section (b) was cork particles and KIMTOWEL, and the nest material of the third test section (c) was a cork sheet alone.
Figure 5:
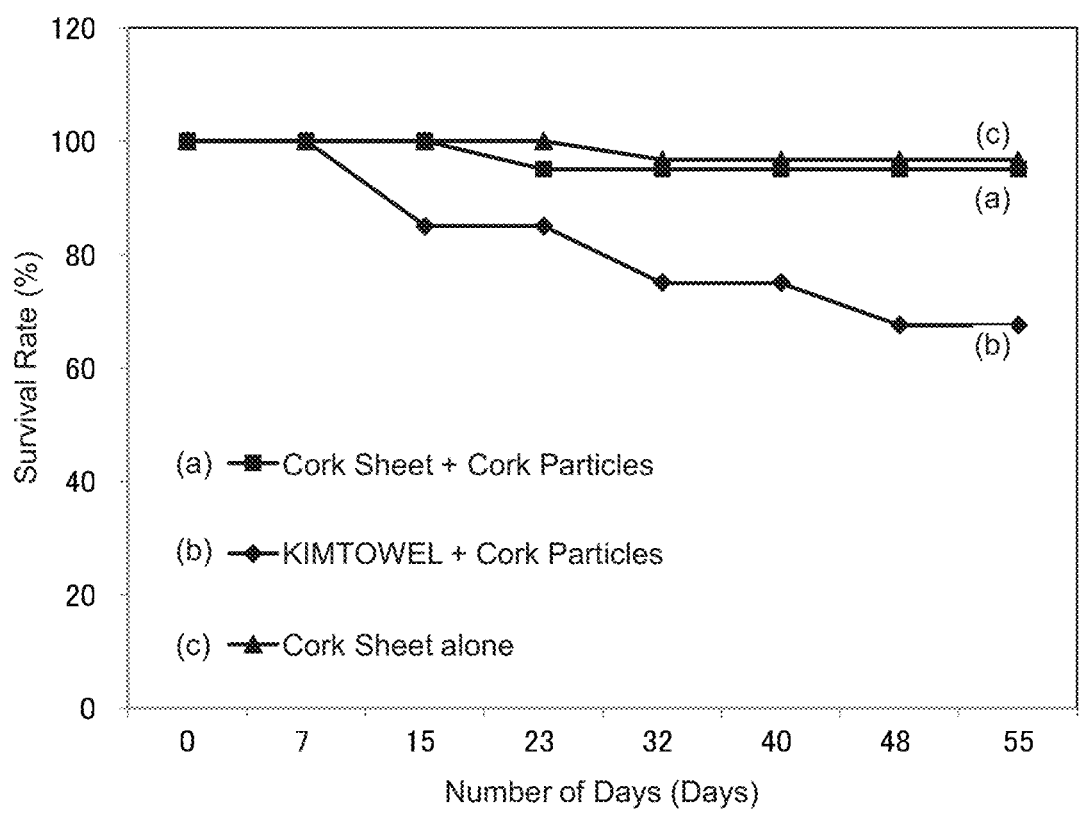
FIG. 5 shows the survival rates in Example 3. In the graph, the change of the survival rates up to 55 days after the different nest materials were provided are illustrated, where the nest material of the first test section (a) was cork particles and a cork sheet, the nest material of the second test section (b) was cork particles and KIMTOWEL, and the nest material of the third test section (c) was a cork sheet alone.

FIG. 3 shows the nest-building rate (in the present Example, the ratio of the individuals that newly attached a nest material to the existing nest), FIG. 4 shows the growth rate, and FIG. 5 shows the survival rate.

According to the results in FIG. 3, the first test section (a) in which cork particles and a cork sheet were provided and the second test section (b) in which cork particles and KIMTOWEL were provided exhibited a nest-building rate of 80% or more on the 14th day. On the other hand, the third test section in which a cork sheet alone was provided exhibited a nest-building rate of less than 30% on the 14th day. This result has revealed that, in the case of cork, the middle-stage bagworm can utilize any one of cork particles and a cork sheet as a nest material, but yielded a markedly low nest-building rate with a cork sheet alone. In addition, it has been revealed that a middle-stage bagworm, provided with a nest material that is a particulate nest material comprising a bark such as cork, can achieve a higher nest-building rate.

According to the results in FIG. 4, the length of the nest was longer in the first test section (a) than in the second test section (b) and the third test section (c). Specifically, the length of the nest on the 21st day was 13 mm in the third test section, but was 30 mm, twice or more as long, in the first test section. The length of a nest is in proportion to the size of a bagworm in the nest. That is, this result suggests that a bagworm in the first test section has a body length twice or more as long as a bagworm in the third test section. It has been revealed that, also in the second test section, the growth rate is higher than with a cork sheet alone in the third test section, hence that a particulate nest material comprising cork is optimal for a middle-stage bagworm, and that a particulate nest material has a growth-facilitating effect.

According to the results in FIG. 5, the survival rate in each of the first test section (a) and the third test section (c) means that almost all the individuals survived throughout the test period of 55 days. On the other hand, in the second test section (b), dead individuals started appearing gradually on the 15th day, and the survival rate decreased to 68% on the 55th day. In the second test section, cork particles+KIMTOWEL were utilized as a nest material. It is conceivable that KIMTOWEL as a paper raw material absorbed water and held the water, with the result that the nest was always excessively humid, thus causing the survival rate to be decreased.

The above-described results have revealed that cork particles are optimal as a nest material for a middle-stage bagworm in terms of the nest-building rate, growth rate, and survival rate.

Example 4: Relationship Between Particle Size of Cork Particles and Growth Rate (Purpose)

A middle-stage bagworm utilizes the cork particles provided as a nest material with being processed slightly so as to hardly change the shape of cork particles, or directly. If a decrease caused in the nest-building labor by a difference in the nest material influences the growth rate, it is conceivable that, among cork particles, cork particles having a particle size having the highest efficiency of utilization provide a higher growth rate. In view of this, the relationship between the particle size (longitudinal diameter) of cork particles utilized as a nest material and the growth rate was examined.

(Method)

The bagworms used were middle-stage bagworms (third to fourth instar larvae) of *Eumeta japonica*.

The following five test sections with different cork particle sizes were provided.

(a) The first test section: 0.53±0.12 mm
(b) The second test section: 1.28±0.20 mm
(c) The third test section: 3.28±0.53 mm
(d) The fourth test section: 5.77±0.58 mm
(e) The fifth test section: 10.63±0.73 mm For each test section, a plastic dish having a diameter of 10 cm and a height of 4 cm, and having a paper filter spread therein was provided, and each nest material and a small amount of artificial diet were disposed in each dish.

In each dish, 10 bagworm individuals reared up to the third to fourth instar without being provided with cork particles were placed, and reared at 24° C. for 24 hours. The number of the individuals that newly attached cork particles to the existing nest after the start of the experiment, that is, the individuals with cork particles utilized as a nest material was calculated, and the length (length of the long axis) of the nest was measured. Subsequently, the bagworms were reared as they were for 6 days, and the length of the nest was measured again on the 7th day after the bagworms were placed. The growth rate was converted in terms of the ratio of extension of the length of a nest, and the length of the nest on the 7th day in the nest building was expressed as a relative value, assuming that the length of the nest on the 1st day in the nest building was 1.

(Results)

The results are shown in FIG. 6. FIG. 6A shows the length of a nest before the start of a test in each test section. FIG. 6B shows the growth rate on the 7th day in the nest building. The nest-building rate on the 1st day in the nest building (the ratio of the individuals that newly attached a nest material to the existing nest in the same manner as in Example 3) was 100% in the first to third test sections, 50% in the fourth test section, and 20% in the fifth test section (not shown). This result has revealed that, although cork particles were suitable as a nest material for a middle-stage bagworm, the nest-building rate differed evidently depending on the particle size, and that the nest-building rate was the best when cork particles from 0.3 mm to 5 mm were provided.

In addition, the longitudinal diameter of a nest was not significantly different among the test sections before the start of the test. However, the longitudinal diameter in the third test section was significantly longer on the 7th day.

The above-described results have revealed that the nest-building rate was high when bark particles having a longitudinal diameter of from 0.3 mm to 5 mm were used as a nest material for a middle-stage bagworm, and that the growth rate was enhanced particularly when bark particles having a longitudinal diameter of from 2.5 mm to 4.0 mm were used.

Example 5: Relationship Between Optimal Longitudinal Diameter of Particulate Nest Material and Kind of Nest Material (Purpose)

Examples 2 to 4 have revealed that cork particles are suitable as a nest material for a middle-stage bagworm, and Example 4 has identified the range of the longitudinal diameter (particle size) of the cork particles in which the nest-building rate was highest. On the other hand, there still remains a possibility that the optimal longitudinal diameter is independent of the kind of the nest material. In view of this, different kinds of particulate nest materials were made to have an optimal longitudinal diameter, and the nest-building rate and growth rate of each material were examined.

(Method)

The bagworms used were middle-stage bagworms (third to fourth instar larvae) of *Eumeta japonica*.

The following three test sections were provided, among which the longitudinal diameters were substantially the same, but the nest materials were different.
  (a) The first test section: cork particles (having a particle size of 3.28 mm)
  (b) The second test section: paper filter (ADVANTEC No2: 3 mm×3 mm×0.26 mm)
  (c) The third test section: plastic beads (3 mm in diameter)

For each test section, a plastic dish having a diameter of 10 cm and a height of 4 cm, and having a paper filter spread therein was provided, and each nest material and a small amount of artificial diet were disposed in each dish.

In each dish, 10 bagworm individuals reared up to the third to fourth instar without being provided with cork particles were placed, and reared at 24° C. for 24 hours. The number of the individuals that attached a nest material after the start of the experiment was calculated, and the length (length of the long axis) of the nest was measured. Subsequently, the bagworms were reared as they were for 8 days, and the length of the nest was measured again on the 9th day after the bagworms were placed.

(Results)

Figure 7:
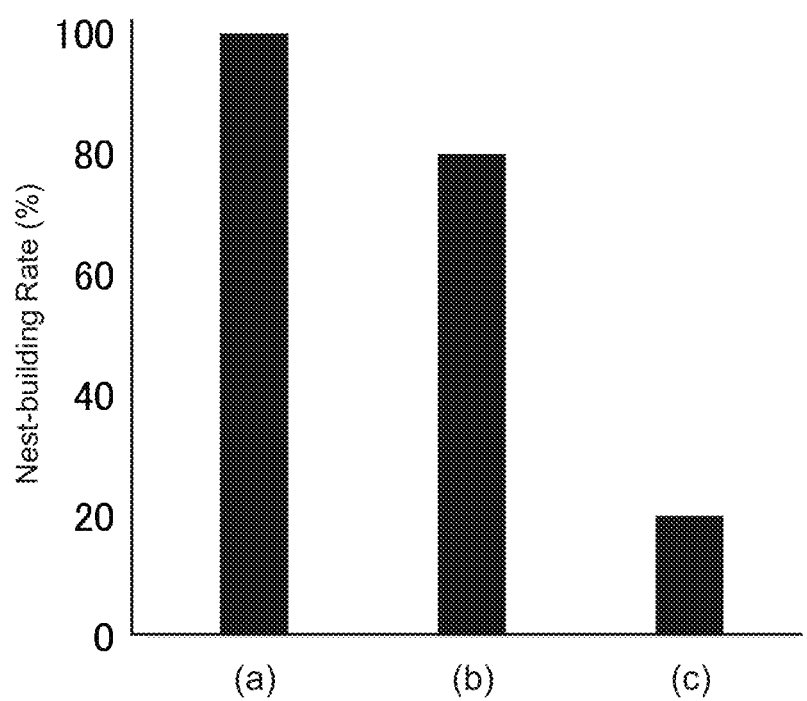
FIG. 7 shows the results of the nest-building rates in Example 5. In the graph, the results obtained when the different nest materials were used are represented, where the nest material of the first test section (a) was cork particles having a particle size of approximately 3 mm, the nest material of the second test section (b) was 3 mm pieces of paper filter, and the nest material of the third test section (c) was plastic beads having a diameter of 3 mm.

FIG. 7 shows the nest-building rate (the ratio of individuals that newly attached a nest material to the existing nest in the same manner as in Example 3). FIG. 8A shows the length (longitudinal diameter) of a nest before the start of a test in each test section. FIG. 8B shows the growth rate on the 9th day in the nest building.

The nest-building rate was 100% in the first test section (a), 80% in the second test section (b), and 20% in the third test section (c). This result has again verified that, even though the longitudinal diameter of the particulate nest material is an optimal value, cork, that is, bark is preferable as a nest material as clarified in Example 1.

In addition, the length of a nest was not significantly different among the test sections on the 1st day in the nest building. However, on the 9th day, the length was the largest expectedly in the first test section in which the nest material was cork. On the other hand, even when paper filter was used as a nest material, optimizing the longitudinal diameter yielded preferable results in terms of the nest-building rate and the longitudinal diameter of a nest. However, when the nest material is paper, it is difficult to say that the paper is suitable nest material, because of the possibility of decreasing the survival rate in a long-time rearing as in the results of Example 3.

The above-described results have revealed that, among the particulate nest materials having an optimal longitudinal diameter, the most suitable nest material is bark.

All publications, patents, and patent applications cited herein should be incorporated herein by reference in their entirety.

The invention claimed is:

1. A method of assisting a bagworm in building a nest, comprising providing the bagworm at each stage of growth with a bagworm nest material constituted by a raw material comprising a same shaped bark or a different shaped bark as part of the nest material in accordance with the stage of growth of the bagworm,
   wherein any shape of the bagworm nest material is provided to an initial-stage bagworm,
   wherein the nest material comprising a particulate bark having a longitudinal diameter of from 0.3 mm to 5.0 mm is provided to a middle-stage bagworm, and
   wherein a plate-like nest material is provided to a late-stage bagworm
   whereby matching of the growth stage of the bagworm with the bagworm nest material increases nest building efficiency and survival rate of the bagworm.

2. The method of assisting a bagworm in building a nest according to claim 1, wherein the bark is a cork.

3. The method of assisting a bagworm in building a nest according to claim 1, wherein the nest material is disinfected or sterilized.

* * * * *